(12) United States Patent
Delnoij et al.

(10) Patent No.: US 7,210,106 B1
(45) Date of Patent: Apr. 24, 2007

(54) AUTHORIZED ITEM DISTRIBUTION LISTS

(75) Inventors: Rob Delnoij, El Cerrito, CA (US); Ruchika Abbi, Fremont, CA (US); Rajani Yelkur, Fremont, CA (US); Jun Gao, Emeryville, CA (US); Ronald G. Roncal, San Mateo, CA (US); Rahul Viswanathan, Fremont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 789 days.

(21) Appl. No.: 10/370,549

(22) Filed: Feb. 19, 2003

(51) Int. Cl.
*G06F 3/00* (2006.01)

(52) U.S. Cl. .................. 715/810; 715/853; 705/28

(58) Field of Classification Search ............ 715/700, 715/764, 810, 835, 846, 853, 962, 733, 738, 715/746; 705/1, 22, 23, 26, 28, 80; 707/100, 707/102, 103 R, 104.1
See application file for complete search history.

(56) References Cited

U.S. PATENT DOCUMENTS

| | | | | |
|---|---|---|---|---|
| 6,868,403 B1* | 3/2005 | Wiser et al. | ............. | 705/51 |
| 6,975,937 B1* | 12/2005 | Kantarjiev et al. | ......... | 701/117 |
| 2002/0055878 A1* | 5/2002 | Burton et al. | ............. | 705/26 |
| 2002/0072988 A1* | 6/2002 | Aram | ........................ | 705/26 |
| 2003/0009392 A1* | 1/2003 | Perkowski | ................. | 705/26 |
| 2003/0033205 A1* | 2/2003 | Nowers et al. | ............. | 705/26 |
| 2003/0204447 A1* | 10/2003 | Dalzell et al. | ............. | 705/26 |
| 2004/0044582 A1* | 3/2004 | Chowdhary et al. | ......... | 705/26 |
| 2004/0044690 A1* | 3/2004 | Kanzinger | ............. | 707/104.1 |
| 2004/0054607 A1* | 3/2004 | Waddington et al. | ......... | 705/28 |
| 2004/0111346 A1* | 6/2004 | Macbeath et al. | ............. | 705/35 |
| 2004/0148309 A1* | 7/2004 | Resch | ........................ | 707/102 |
| 2004/0158504 A1* | 8/2004 | Gross | ........................ | 705/26 |
| 2005/0004704 A1* | 1/2005 | Wiesenbach De Lamaziere et al. | ........................ | 700/219 |

* cited by examiner

*Primary Examiner*—Lucila X. Bautista
(74) *Attorney, Agent, or Firm*—Campbell Stephenson Ascolese LLP

(57) ABSTRACT

A facility for specifying the distribution of products and generating product distribution lists. The facility receives account definitions, which may include information specifying account hierarchies. One or more product categories may be associated with each account. A distribution code may also be associated with the account's category assignment. The facility may identify or more products associated with the account, and a product distribution code may be associated with each product in the category. Based on the distribution level for each category and the product distribution codes for each product in the category, the facility may identify products for a product distribution list associated with an account.

18 Claims, 16 Drawing Sheets

| | Show: Accounts ▽ | | | | | | |
|---|---|---|---|---|---|---|---|
| | New  Query | | | | | | |
| Name 607 | Site 608 | Phone 609 | Status 610 | Type 611 | Account Team 612 | Account Class 613 |
| A.K. Parker Inc. | H.Q. Corporate | (415) 329-6500 | Active | Company | SSMITH | Customer |
| A.K. Parker Distribution | Distribution | (435) 524-0299 | Active | Distributor | DMARTIN | Customer |
| Bronce Distribution | 3rd Party Distribution | (435) 329-6289 | Active | Distributor | HDOE | Customer |
| Bob's Corner Grocery | Grocery Store | (218) 428-0151 | Active | Grocery Store | DJACOBS | Customer |
| The Misty Market | Grocery Store | (218) 428-3016 | Active | Grocery Store | ACRAIG | Customer |
| Super Duper Market | Grocery Store | (435) 229-8114 | Active | Grocery Store | LJONES | Customer |

601 — A.K. Parker Inc.
602 — A.K. Parker Distribution
603 — Bronce Distribution
604 — Bob's Corner Grocery
605 — The Misty Market
606 — Super Duper Market

*Fig. 6*

| Category: PENS 801 | Premium | Preferred | Standard | Limited |
|---|---|---|---|---|
| Jumbo Soft Gel BLUE | X | | | |
| Jumbo Soft Gel BLACK | X | | | |
| Super Soft Gel RED | X | | | |
| Super Soft Gel BLUE | X | | | |
| Super Soft Gel BLACK | X | X | | |
| Scriptomatic | X | X | | |
| Classic Caligrapher | X | X | | |
| Comfort Plus BLACK | X | X | X | |
| Comfort Plus BLUE | X | X | X | |
| SmoothWriter Plus | X | X | X | |
| SmoothWriter RED | X | X | X | X |
| SmoothWriter BLUE | X | X | X | X |
| SmoothWriter Black | X | X | X | X |

| Category: PET FOOD 802 | Premium | Preferred | Standard | Limited |
|---|---|---|---|---|
| Gold Fin Fish Food | X | | | |
| Wild Bird Food Mix | X | | | |
| The Kitty Gourmet – Tuna | X | | | |
| Tender Chunks Dog Food | X | | | |
| Tender Tasties Cat Food | X | X | | |
| Happy Kat Cat Nip | X | X | | |
| Gourmet Giblets Chicken | X | X | | |
| Gourmet Giblets Beef | X | X | X | |
| Yum Yum Dog Treats | X | X | X | |
| Spot Brand Kitten Food | X | X | X | X |
| Spot Brand Puppy Food | X | X | X | X |
| Spot Brand Dog Food | X | X | X | X |
| Spot Brand Cat Food | X | X | X | X |

Fig. 8

Fig. 9

AUTHORIZED ITEM DISTRIBUTION LISTS

TECHNICAL FIELD

The described technology relates generally to managing distribution of items and more particularly to authorized item distribution lists.

BACKGROUND

Within the consumer goods industry, consumer goods companies (e.g., product manufacturers, distributors, etc.) distribute products to various customers down the line (e.g., distributors, wholesale establishments, retail establishments, etc.). Distribution may often occur on an ongoing basis. To make distribution possible, a marketing administrator typically creates product distribution lists that control which of a company's products are available for distribution to various customer accounts.

Most consumer goods companies are organized using a hierarchical structure that is typically based on the company's channels of distribution. Thus, consumer goods companies often have the problem of managing complex authorized product distribution lists containing hundreds of products down the account hierarchy while keeping track of the supplying accounts. Currently this is a tedious and labor-intensive process.

A consumer goods company's channels of distribution are typically defined as either direct or indirect. With direct distribution, a key account, sometimes the company's own distribution center, is the sole intermediary between the product origination source and the retail outlets. With indirect distribution, there is another intermediary, such as a third-party distributor, between the key account and the retail outlets. This intermediary is sometimes called an indirect account.

A company using an indirect distribution scheme typically authorizes its products for retail distributions at the key account, indirect account and retail outlet levels. This method is often referred to as retail product authorization. Using this method, consumer goods companies often build distribution lists from a set of products available to the indirect account. This set of products is typically a subset of the products from the key account distribution list.

It would be desirable to have a facility to more effectively manage distribution and the generation of product distribution lists.

BRIEF DESCRIPTION OF THE DRAWINGS

FIG. 6 is a display diagram showing a sample user interface displaying an account hierarchy in one embodiment.

FIG. 8 is a data diagram showing an example of relationships between products and product distribution codes in one embodiment.

FIG. 9 is a display diagram showing a sample user interface displaying an authorized accounts view in one embodiment.

DETAILED DESCRIPTION

I. Introduction

Figure 1:
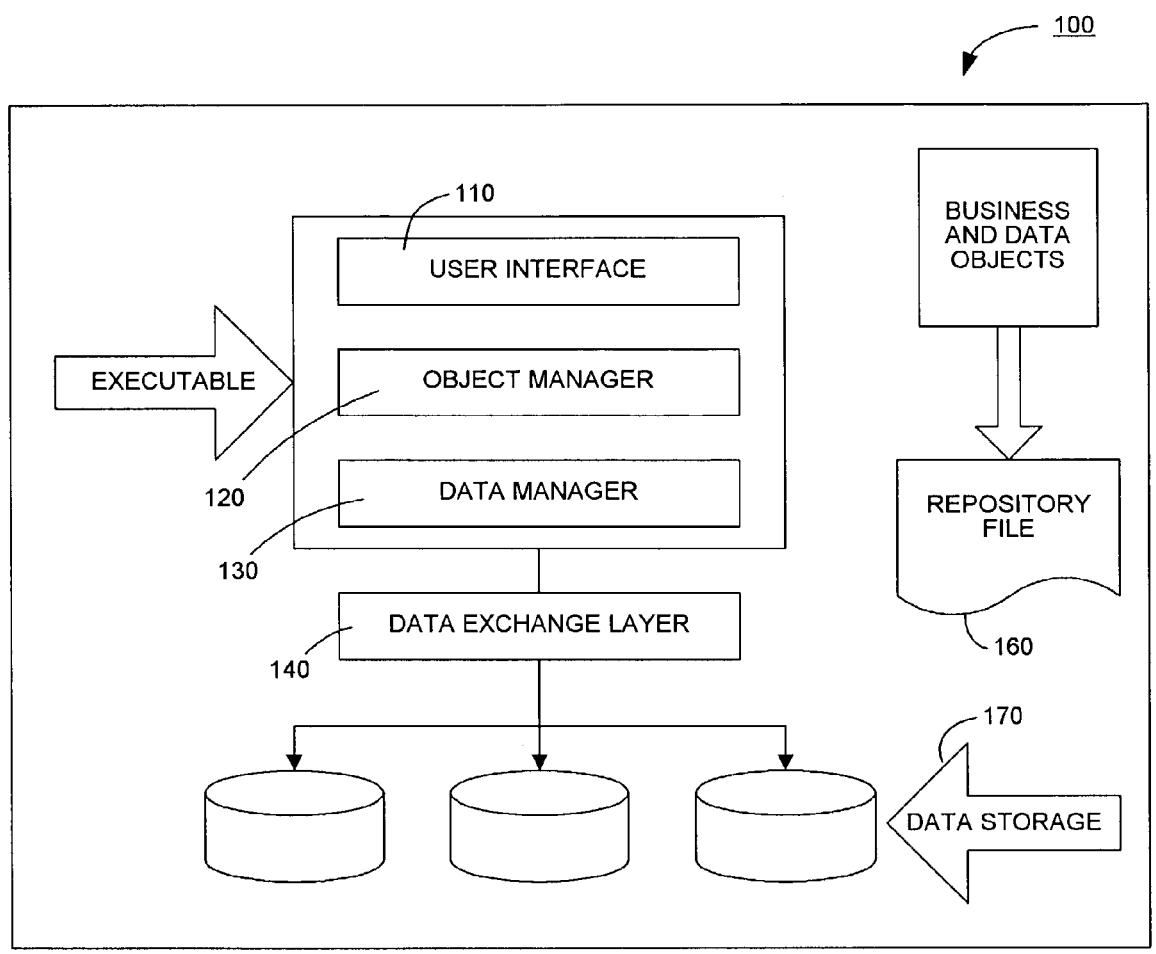
FIG. 1 shows a multi-layered system architecture in which the teachings of the present invention may be implemented.

A facility for managing product distribution and creating product distribution lists is provided. In some embodiments, the facility handles product information for products distributed by a product distributing company and account information for customers (e.g., subsidiaries, affiliates, distributors, retailers, etc.) of the product distributing company. The product information may include an association of a product with one or more product categories. Each product may further be associated with a distribution code (e.g., premium, preferred, standard, limited, etc.) for each category with which it is associated. For example, a beverage product Grapefizz may be associated with both a Fizzy product category and a Fruity product category. Grapefizz may then be assigned a standard distribution code with respect to the Fizzy product category and a preferred distribution code with respect to the Fruity product category. In some embodiments, distribution code assignments may be account-specific; however, default distribution code assignments may also be available across accounts.

Account information may include a definition of a distribution hierarchy for an account. For example, customer Ace Corporation uses two distribution warehouses, Ace Distribution East and Ace Distribution West, as distribution centers. Each warehouse supplies a number of retail outlets throughout North America. Ace Corporation Corporate Headquarters determines which beverage items are stocked at each warehouse. In addition, Ace Corporation employs a third-party wholesaler, Good Company Distribution, to supply products to outlets within the state of Louisiana, in the United States. Accordingly, the account hierarchy for Ace Corporation may include Ace Corporation Corporate Headquarters at the top level, a middle level consisting of Ace Distribution East, Ace Distribution West, and Good Company Distribution, and a lower level consisting of the various retailers. Because the middle level accounts all function as suppliers, they may also be identified as key accounts.

Account information may also include an indication of an account distribution scheme (e.g., exclusive or inclusive). An account distribution scheme defines how products are to be distributed within a product hierarchy. To facilitate the efficient creation of product distribution lists, account information may also include a list of product categories for the account. This information allows the contents of distribution lists to be specified by category instead of product by product. To further facilitate the efficient creation of distribution lists, each category specified for the account may be associated with a product distribution code. The facility can then compare the category distribution code information with the product distribution code information to generate product distribution lists.

Referring to the previous example, both of Ace Corporation's distribution warehouses (Ace Distribution East and West) are given a distribution code of premium for the Fizzy category and a distribution code of standard for a Splash category. Since Ace uses the inclusive distribution method, this designation authorizes both warehouses to receive all the distributing company's beverage products that are part of the Fizzy category and all beverage products in the Splash category that have a distribution code of standard or limited. However, since Louisiana bans the sale of alcoholic fruit drinks, the third-party wholesaler in Louisiana, Good Company Distribution, is not licensed to distribute them. The Good Company Distribution subaccount is then given a distribution code of limited for the Fizzy category, so that only the subset of the distributing company's products that does not contain alcoholic fruit drinks gets shipped to the Good Company warehouse.

Using the account hierarchy scheme and product distribution lists, administrators can track and manage supplier accounts (i.e., key accounts) such as the Ace Distribution East account in the example given above. For example, if Ace Distribution East is having a problem meeting the demand for beverage products for all the retail outlets it supplies, an account administrator can easily designate Ace Distribution West as the alternative supplier for those outlets in the account hierarchy. Tracking supplier information in this way also allows for efficient modification of the distribution list higher up in the distribution hierarchy. For example, if the same product is supplied to a subaccount via more than one supplier, discontinuing supply of the product from one supplier will not affect the products on the authorized distribution list for that account. If, however, all the suppliers for a product do not supply the product to the subaccount, the product can be removed entirely from the authorized distribution list for that account.

II. Facility Overview and Overall Architecture

In some embodiments, a system in which the teachings of the present invention are implemented can be logically structured as a multi-layered architecture as shown in FIG. 1. The logical multi-layered architecture as shown in FIG. 1 may provide a platform for common services to support the various applications. These services may include a user interface layer 110, an object manager layer 120, a data manager layer 130 and a data exchange layer 140.

In some embodiments, the user interface layer 110 may provide the applets, views, charts and reports, etc., associated with one or more applications. In some embodiments, various types of clients can be supported via the user interface layer 110. These various types of clients may include traditional connected clients, remote clients, thin clients over an intranet, Java thin clients or non-Windows-based operating systems, and HTML clients over the Internet, etc.

In some embodiments, the object manager layer 120 is designed to manage one or more sets of business rules or business concepts associated with one or more applications and to provide the interface between the user interface layer 110 and the data manager layer 130. The business rules or concepts can be represented as business objects. The business objects may be designed as configurable software representations of the various business rules or concepts such as accounts, contacts, opportunities, service requests, solutions, etc.

In some embodiments, the data manager layer 130 is designed to maintain logical views of the underlying data and to allow the object manager to function independently of underlying data structures or tables in which data are stored. In some embodiments, the data manager 130 may also provide certain database query functions such as generation of structure query language (SQL) in real-time to access the data. The data manager 130 may be designed to operate on object definitions in a repository file 160 that define the database schema. In some embodiments, the data storage services 170 provide the data storage for the data model associated with one or more applications.

In some embodiments, the data exchange layer is designed to handle the interactions with one or more specific target databases and provide the interface between the data manager layer 130 and the underlying data sources.

Figure 2:
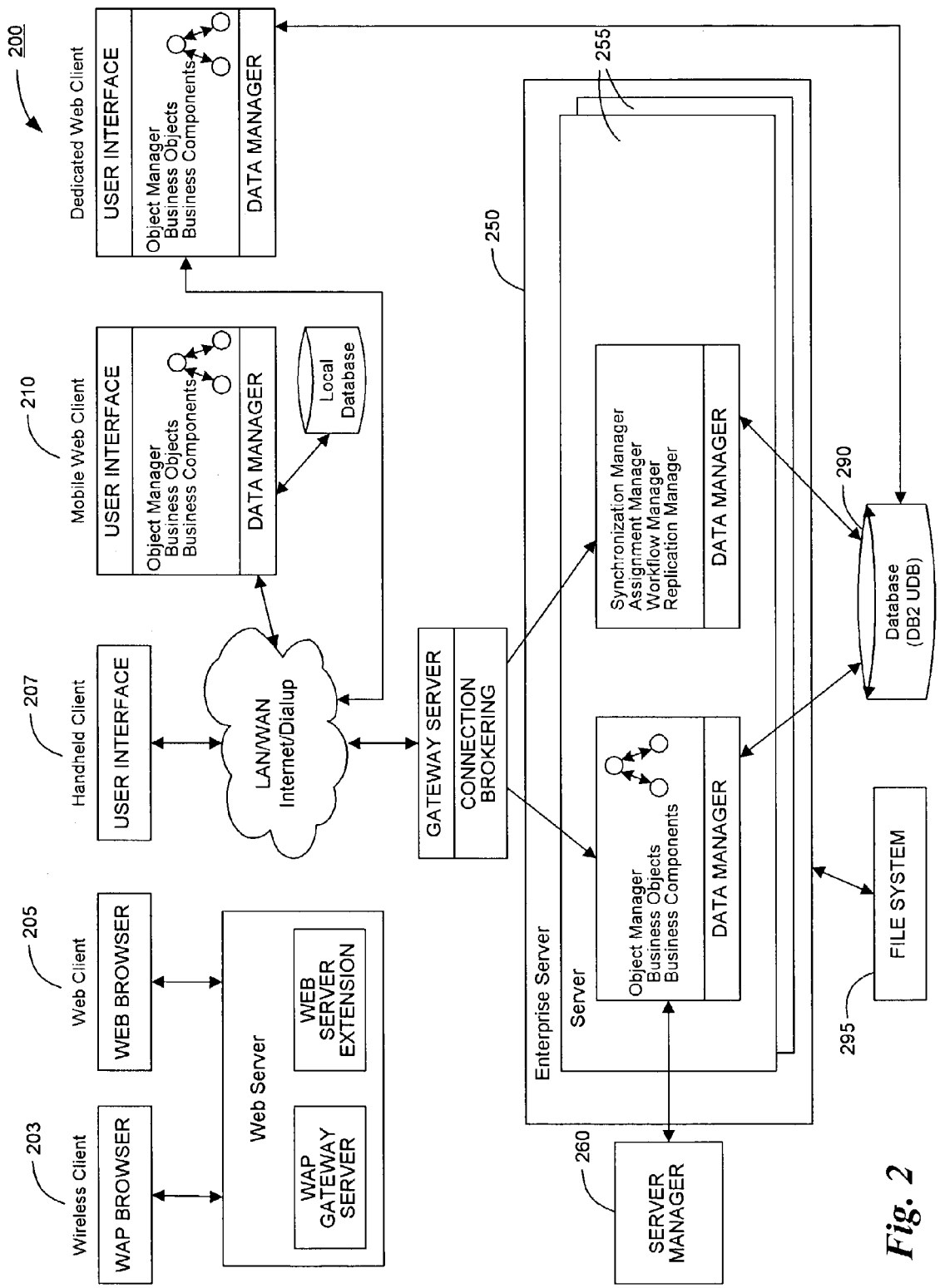
FIG. 2 shows a block diagram of one embodiment of a system configuration in which the teachings of the present invention may be implemented.

FIG. 2 shows a block diagram of some embodiments of a system configuration in which the teachings of the present invention are implemented.

In some embodiments, the multi-layered architecture allows one or more software layers to reside on different machines. For example, in some embodiments, the user interface, the object manager and the data manager can all reside on dedicated web clients 200. For other types of clients such as the wireless clients 203, in some embodiments, the object manager and data manager can reside on a system server. It should be appreciated and understood by one skilled in the art that the system configuration shown in FIG. 2 is for illustrative and explanative purposes and may vary depending on the particular implementations and applications of the teachings of the present invention.

In some embodiments, the system environment illustrated in FIG. 2 may include more than one database 290. One or more subsets of the database 290 can be created or replicated by a replication manager. In addition, mobile web clients 210 can have additional remote databases (also called local databases). In some embodiments, unless the remote or local databases associated with the mobile web clients 210 are defined as read-only databases, these mobile web clients can create and update data locally that will ultimately be propagated up to the primary database when each mobile web client synchronizes with the system server.

In some embodiments, the database 290 is designed to store various types of data, including predefined data schema (e.g., table objects, index objects, etc.), repository objects (e.g., business objects and components, view definitions and visibility rules, etc.), and user's or customer's data. Dedicated web clients 200 and server components, including those that operate in conjunction with the other types of clients, can connect directly to the database 290 and make changes in real-time. In some embodiments, mobile web clients 210 can download a subset of the server's data to use locally, and periodically synchronize with the server database through the system server to update both the local and the server database.

In some embodiments, various tables included in the database 290 may be logically organized into the following types: data tables, interface tables, repository tables, etc.

In some embodiments, data tables may be used to store user business data, administrative data, seed data, transaction data, etc. In some embodiments, these data tables may be populated and updated through the various applications and processes. Data tables may include the base tables and the intersection tables. In some embodiments, base tables may contain columns that are defined and used by the various applications. The base tables may be designed to provide the columns for a business component specified in the table property of that business component. Intersection tables are tables that may be used to implement a many-to-many relationship between two business components. They may also hold intersection data columns, which store information pertaining to each association. In some embodiments, intersection tables provide the data structures for association applets.

In some embodiments, interface tables are used to denormalize a group of base tables into a single table with which external programs can interface. In some embodiments, they may be used as a staging area for exporting and importing of data.

In some embodiments, repository tables contain the object definitions that specify one or more applications regarding:

The client application configuration

The mapping used for importing and exporting data

Rules for transferring data to mobile clients

In some embodiments, the file system 295 is a network-accessible directory that can be located on an application server. The file system 295 stores the physical files created by various applications, such as files created by third-party text editors, and other data that is not stored in the database 290. In some embodiments, physical files stored in the file system 295 can be compressed and stored under various naming conventions. Dedicated web clients 200 can read and write files directly to and from the file system 295. Mobile web clients 210 can have a local file system, which they periodically synchronize with the server-based file system 295. In some embodiments, other types of clients such as the wireless clients 203 and the web clients 205 can access the file system 295 via the system server.

In some embodiments, the enterprise server 250 is a logical grouping of the system servers 255 that share a common table owner or a database, point to a common gateway server and can be administered as a group using a server manager 260. The connection to the gateway server can be established via TCP/IP. The enterprise server 250 can be scaled effectively by deploying multiple system servers 255 in the enterprise server 250, thus providing a high degree of scalability in the middle tier of applications.

In some embodiments, the server 255 runs one or multiple server programs. It handles the incoming processing requests and monitors the state of all processes on the server. Server programs may be designed and configured to perform one or more specific functions or jobs including importing and exporting data, configuring the database, executing workflow and process automation, processing to support mobile web clients 210 for data synchronization and replication, enforcing business rules, etc. In some embodiments, the server 255 can be an NT service (under the Windows NT operating system) or a daemon process (e.g., a background shell process) under the UNIX operating system. In some embodiments, the server 255 supports both multi-process and multi-threaded components and can operate components in batch, service and interactive modes.

In some embodiments, the server manager 260 is configured as a utility that allows common control, administration and monitoring across disparate programs for the servers 255 and the enterprise server 250. In some embodiments, the server manager 260 can be used to perform the following tasks: start, stop, pause and resume servers 255, components and tasks; monitor status and collect statistics for multiple tasks, components and servers within an enterprise server; and configure the enterprise server, individual servers, individual components and tasks, etc.

In some embodiments, the gateway server can be configured as a logical entity that serves as a single entry point for accessing servers. It can be used to provide enhanced scalability, load balancing and high availability across the enterprise server. In some embodiments, the gateway server may include a name server and a connection brokering component. In some embodiments, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as an NT service. In a UNIX environment, the name server can run as a daemon process. In some embodiments, the connection brokering component is used to perform load balancing functions such as directing client connection requests to an appropriate server (e.g., the least-busy server).

As illustrated in FIG. 2, the various types of clients that can be supported by the system may include the following: dedicated web clients 200, mobile web clients 210, web clients 205, wireless clients 203, handheld clients 207, etc.

In some embodiments, dedicated web clients 200 (also called connected clients) are connected directly to a database server for data access via a LAN or WAN connection. In some embodiments, these connected or dedicated web clients do not store data locally. These dedicated web clients 200 can also access the file system directly. In some embodiments, the user interface, the object manager and the data manager layers of the multi-layered architecture reside on the dedicated web client 200.

In some embodiments, the mobile web clients 210 are designed and configured for local data access and thus can have their own local database and/or local file system. Mobile web clients 210 can interact with other components within the system via the gateway server. Through synchronization, the modifications from the local database and the server database can be exchanged. Mobile web clients 210 are described in more detail below.

In some embodiments, a web client 205 runs in a standard browser format from the client's machine and can connect to a system server 255 through a web server. The system server 255 may be designed and configured to execute business logic and access data from the database 290 and file system 295. The web client 205 described herein is designed and configured in accordance with the teachings of the present invention to operate in an interactive mode. The interactive web client framework as described herein may utilize dynamically created objects implemented in JavaScript on the browser side that correspond to objects on the server side. These dynamically created objects on the browser side may include the current view and its corresponding applets, the current business object and the corresponding business components, etc. The web client 205 is described in more detail below.

In some embodiments, wireless clients are essentially thin clients enabled on wireless devices. The wireless clients can use a wireless application protocol (WAP)-based user interface to communicate and exchange information/data with the system server.

The system configuration illustrated in FIG. 2 is described in more detail below with references to various structures, databases, tables, file systems, etc., as illustrating examples.

Figure 3:
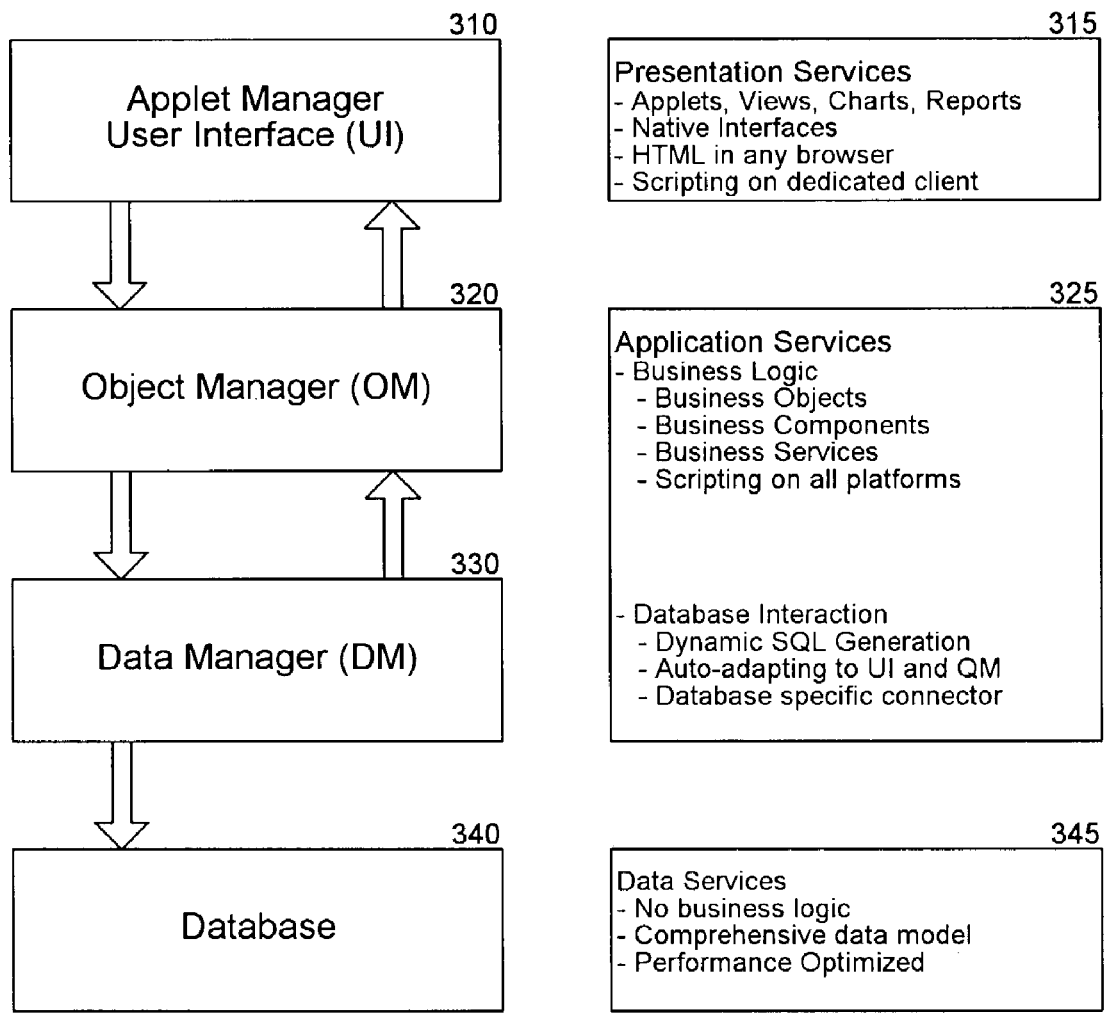
FIG. 3 shows a block diagram illustrating another logical representation of a multi-layered architecture in which applications can be built in accordance with the teachings of the present invention.

FIG. 3 shows a block diagram illustrating another logical representation of a multi-layered architecture in which applications can be built in accordance with the teachings of the present invention. Again, the multi-layered architecture as illustrated in FIG. 3 provides the configured platform for various common services designed to support the various applications. In some embodiments, these various services may include presentation services logic layer 315, which corresponds to an applet manager and user interface layer 310, application services logical layer 325, which corresponds to an object manager (OM) layer 320, and a data manager (DM) layer 330 and data services logical layer 345, which correspond to a database layer 340.

In some embodiments, the presentation services 315 may be designed and configured to support various types of clients and may provide them with user interface applets, views, charts and reports, etc. As described above, a large variety of clients may be supported (e.g., wireless clients, handheld clients, web clients, mobile web clients, dedicated (connected) clients, etc.).

In some embodiments, the application services 325 may include business logic services and database interaction services. In some embodiments, business logic services provide the class and behaviors of business objects and business components. Database interaction services may be designed and configured to take the user interface (UI) request for data from a business component and generate the database commands (e.g., SQL queries, etc.) necessary to satisfy the request. For example, the database interaction services may be used to translate a call for data into DBMS-specific SQL statements.

In some embodiments, data services 345 may be designed and configured to provide the data storage for the underlying data model that serves as the basis of the various applications. For example, the data model may be designed and configured to support various software products and applications including call center, sales, services and marketing, etc., as well as various industry vertical products and applications such as eFinance, eInsurance, eCommunications and eHealthcare.

Figure 4:
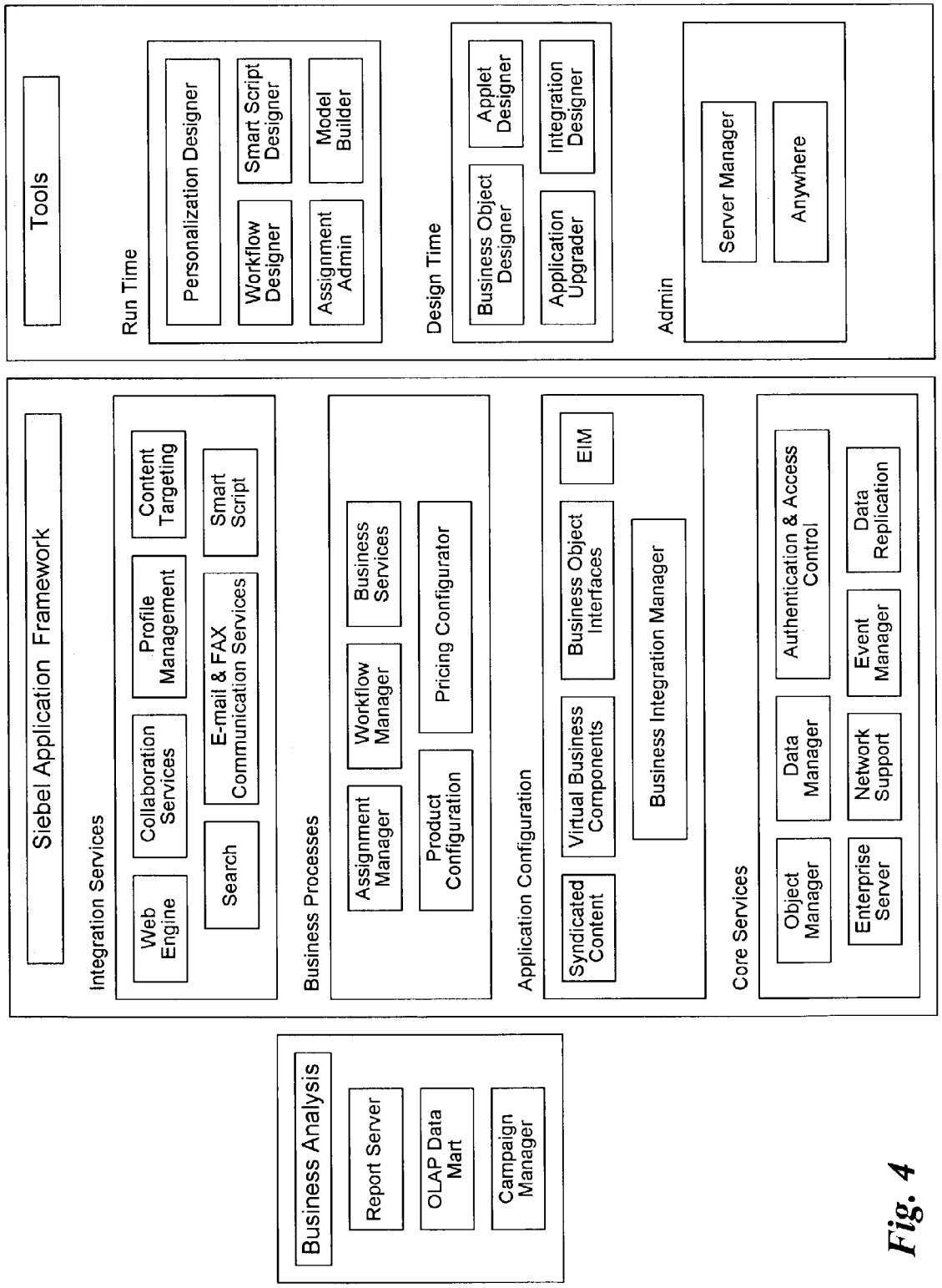
FIG. 4 illustrates a block diagram of one embodiment of an application framework in which the teachings of the present invention may be implemented.

FIG. 4 illustrates a block diagram of some embodiments of an application framework in which the teachings of the present invention may be implemented. As illustrated in FIG. 4, the application framework may include various logical groupings of various types of services and various types of tools that can be used to design and configure particular applications based on business needs and environments.

In some embodiments, the core services are designed and configured to provide the framework in which the applications execute. In some embodiments, the core services may include the following:

The enterprise server, which is the middle-tier application server

The networks that link all of these pieces together

Facilities like event manager and data replication, which allow sharing data between multiple installations of various applications, as well as between the various applications and other external applications The authentication, access control and security facilities In some embodiments, application integration services may be designed and configured to allow the various applications built in accordance with this framework to communicate with the external world. In some embodiments, the various types of services in this logical grouping may be designed and configured to provide for real-time, near-real-time and batch integration with external applications. For example, these integration services may be used to enable communications between external applications and internal applications using available methods, technologies and software products. In some embodiments, application integration services allow the systems or applications to share and replicate data with other external enterprise applications. Accordingly, these services allow a particular application or system to be both a client requesting information and a server having information requested from it.

In some embodiments, business process services are designed and configured to allow the client to automate business processes through the application. In some embodiments, these various business process services may include the following:

Assignment of tasks through Assignment Manager

Enforcement of business practices through Workflow Manager

Reuse of custom business logic through Business Services

Ensuring proper product configuration and pricing through the Product Configurator and Pricing Configurator In some embodiments, creation of these business processes can be done through Run-Time tools such as Personalization Designer, Workflow Designer, SmartScript Designer, Assignment Administration Views and Model Builder.

In some embodiments, integration services may be designed and configured to provide the client with user interface and thin client support. In some embodiments, these may include capabilities for building and maintaining web-based applications, providing web support facilities such as user Profile Management, Collaboration Services and Email and Fax services, advanced Smart Scripting, etc.

In some embodiments, design time tools may be designed and configured to provide the services to customize, design, provide integration points and maintain the application. These various tools provide one common place to define the application.

In some embodiments, administrative services are designed and configured to provide one place to monitor and administer the application environment. These types of services allow the user to administer the application either through a graphical user interface (GUI) or from a command line, etc.

III. User Interface and Account Hierarchies

Sample user interfaces are described with respect to FIGS. 5–7 and 9–12. While only certain examples are given, a person skilled in the art would appreciate that many other user interfaces could be implemented without departing from the scope of the invention. The terms "applet," "window" and "view" are generally used interchangeably herein. The pages described herein may be implemented using, for example, XML (extensible markup language) or HTML (hypertext markup language) combined with scripts that provide information to a user. The web pages are stored and/or transmitted as display descriptions, graphical user interfaces or other methods of depicting information on a screen (whether computer, PDA, mobile telephone, or other) where the layout and information or content to be displayed on the page are stored in a database or other storage facility. While aspects of the invention are described using a network environment, some or all features may be implemented within a single-computer environment.

Figure 5:
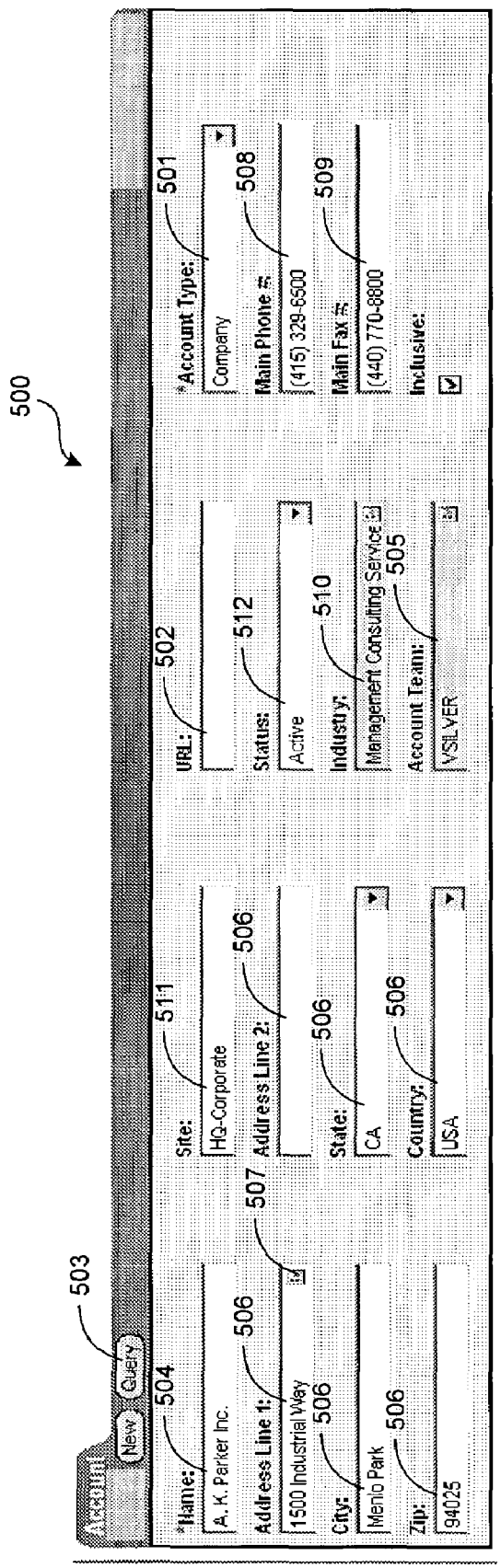
FIG. 5 is a display diagram showing an example of various data fields associated with an account.

FIG. 5 is a display diagram showing an account view 500 sample user interface, which displays various data fields associated with an account or subaccount. An account may be used to represent the wholesale and retail companies to which consumer goods companies sell products, and the organizations and physical locations within those companies. Consumer goods companies can also use accounts to represent their own companies and distributors, or even competitor companies. Thus, the account view 500 can display information associated with an account or subaccount at any level within an account hierarchy.

Creating top-level accounts is the first step to creating product distribution lists. In some embodiments, the administrative user may import account-related information from another database in the network and avoid the need to enter this information manually. Alternatively, as shown in the account view 500 of FIG. 5, administrators and end users can add and modify accounts manually as needed, for example, as new customers are added and as existing customers add new retail outlets.

In some embodiments, accounts can be classified in many ways. Standard classifications can drive specific application functionality. For example, classifying an account by TYPE 501, such as retailer or distributor, can drive a dynamic profile attribute form that determines the profile information that is stored and displayed for the account.

Administrators can create addresses for accounts using, for example, a URL field 502. Later, administrators or end users can associate account addresses with the appropriate subaccounts. This information may then be accessed using a QUERY function 503. Administrators can also edit existing addresses via the provided text fields and, in some cases, associated dialog boxes.

In addition to the TYPE 501 and URL 502 data fields described above, the account data fields shown in the embodiment illustrated in FIG. 5 may also include ACCOUNT NAME 504 and ACCOUNT TEAM 505 fields. An account team may consist of a list of employees who are working with the account. This list determines who can access information about the account. The primary team member can be determined by the system administrator or by whoever created the account record.

Various ADDRESS fields 506 identify input information relating to an account address. An account can have multiple addresses. The user can click an address select button 507 to access an account addresses dialog box (not shown), where the user can select an existing address or add a new one. From the account addresses dialog box, the user can also edit an existing address. However, changing this address may, in some embodiments, also change every instance of the address accessible by the facility, that is, for all the other accounts and contacts that are associated with the account. The account view 500 may also include PHONE 508 and FAX 509 number fields.

An INDUSTRY field 510 can be used to identify the type of industry of the account (e.g., manufacturing or service). These fields may hold multiple industry designations. A SITE field 511 can be used to identify a description of the physical location or function of the account, such as headquarters, corporate or San Francisco. A STATUS field 512 can be used to identify a status for the account (e.g., active, prospective, closed, etc.).

Once accounts are created, the facility allows users to manage and administer account hierarchies for each customer account. In some embodiments, users can create parent-child relationships between accounts, as described in association with FIGS. 6 and 9. For example, for a large chain of drugstores, users can establish a four-level hierarchy with a corporate headquarters office at the top level, regional offices in the second level, distribution centers at the third level and retail stores at the fourth level. For a distributor, users might establish a two-level hierarchy with the distributor at the top level and the retail outlets it serves at the second level. If a company uses a third-party distributor for its products, users can associate this indirect account as well. In the illustrated embodiment, accounts can have an unlimited number of subaccounts, but only one parent account. However, other parent-child combinations may be implemented without departing from the scope of the invention.

Various administrative procedures related to accounts may include adding an account, setting up an account hierarchy, profiling an account, creating account contacts, creating addresses for an account, creating account assessment templates, assigning account team members, etc.

Various end-user procedures related to accounts may include adding or modifying an account, removing members from an account team, associating activities to an account, adding opportunities to an account, associating contacts with an account, associating addresses to an account, performing an account (or retail) assessment, entering additional demographics information, etc.

FIG. 6 is a sample user interface showing an example of an account hierarchy. In this example, an A.K. Parker parent account 601 includes an A.K. Parker Distribution subaccount 602 and a Bronce Distribution subaccount 603. These subaccounts are examples of distributor/supplier subaccounts because they function as suppliers for other subaccounts, whereas Bob's Corner Grocery 604, The Misty Market 605 and Super Duper Market 606 are examples of retail subaccounts. Each account and subaccount in the hierarchy is shown with associated NAME 607, SITE 608, PHONE 609, STATUS 610, TYPE 611, ACCOUNT TEAM 612 and ACCOUNT CLASS 613 fields.

IV. Distribution Codes and Product Distribution Lists

Figure 7:
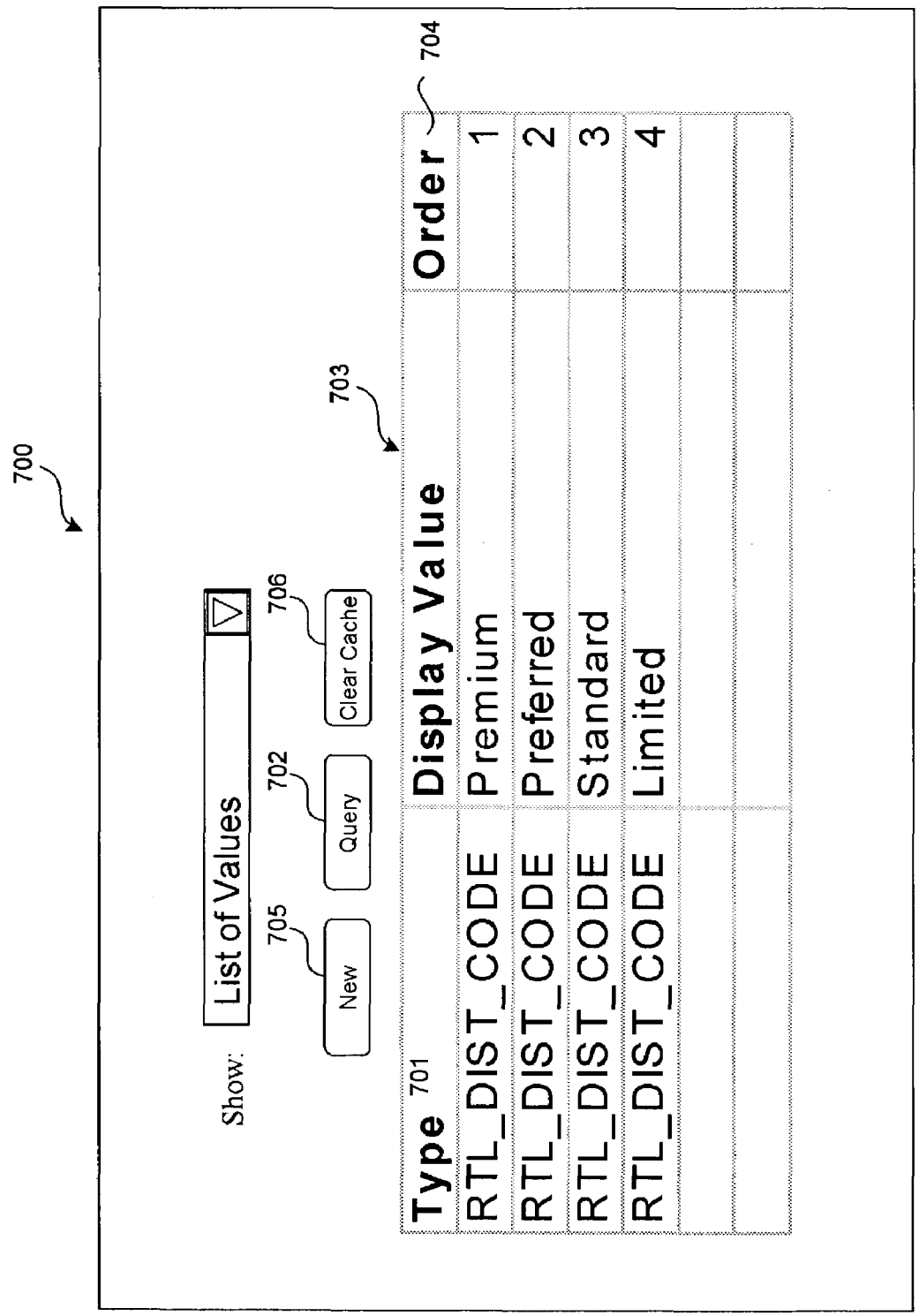
FIG. 7 is a display diagram showing a sample user interface through which a user may specify distribution codes in one embodiment.

FIG. 7 is an example of a user interface displaying a list of values view 700, through which a user may specify distribution codes. Administrators may identify a set of distribution codes (e.g., {premium, preferred, standard, limited}, {preferred, standard, limited}, {A, B, C}, etc.) and in some cases, assign sequence or order to each code within the set. Once distribution codes are established, users can assign distribution codes to both products and categories. The facility can then use the distribution codes to generate a distribution list of the products that one or more accounts within an account hierarchy are authorized to receive. Distribution codes can be applied to the appropriate level of the distribution account hierarchy for each customer, usually for the customer's distribution centers and to the outlets they serve, and to any or all of the products available for distribution using the facility. Each subaccount receives either the full set or a subset of products authorized for the key distributor accounts directly above that subaccount in the hierarchy.

To set up distribution codes, the user navigates to the list of values view 700. In the TYPE column 701, the user queries for RTL_DIST_CODE using a QUERY button 702. The query results 703 show all the account distribution codes that have been created. In the ORDER column 704, the user assigns a different number to each distribution code to create a sequence. When an inclusive distribution scheme is invoked, the sequence determines the order in which the distribution codes appear on the distribution code list, as further described with respect FIG. 8. To create a new distribution code, the user selects a NEW button 705 and names the new distribution code. The user can also select a CLEAR CACHE button 706, which clears the current distribution code scheme and allows the user to begin defining a new set of distribution codes.

Distribution schemes can be either inclusive or exclusive. In both inclusive and exclusive distribution systems, the distribution codes may be used to govern how products move from key accounts to subaccounts. FIG. 8 is a data diagram showing an example of an inclusive product distribution code relationship for a selected category. With inclusive distribution, the sequence or order that is assigned to a group of distribution codes in a list of values is used to assign rank to accounts. For example, a number of outlets might have different distribution codes within a Pens category 801 and a Pet Food category 802. Subaccounts with a premium distribution code 803 for the Pens category 801 receive the entire key account's list of pens, that is, products with distribution codes premium 803, preferred 804, standard 805 or limited 806. Outlets with the distribution code preferred 804 receive a subset of the entire list, which includes products with preferred 804, standard 805 and limited 806 distribution codes. Outlets with the distribution code standard 805 receive a subset of the entire list, which includes products with standard 805 and limited 806 distribution codes. Outlets with the distribution code limited 806 in the Pens category 801 receive only those products with the distribution code limited 806.

Table 1 shows an example of distribution codes in an exclusive distribution system.

TABLE 1

Distribution Codes and Products in an Exclusive System

| Distribution Code | Order | Subaccount Receives: |
|---|---|---|
| Premium | 1 | Products with Premium Distribution Code |
| Standard | 2 | Products with Standard Distribution Code |
| Limited | 3 | Products with Limited Distribution Code |

With exclusive distribution, each distribution code defines a specific subset of products that is independent of the order assigned to the distribution codes. In an exclusive distribution system, outlets with the distribution code premium in a Beverages category receive a subset of the key account's distribution list of products, which includes products within the category that are identified with a premium distribution code. Outlets with the distribution code standard in the category Beverages receive a subset of the entire list, which includes only those products with the distribution code of standard in the Beverages category. Outlets with the distribution code limited in the category Beverages receive only the products with the distribution code of limited in the Beverages category.

Figure 9:
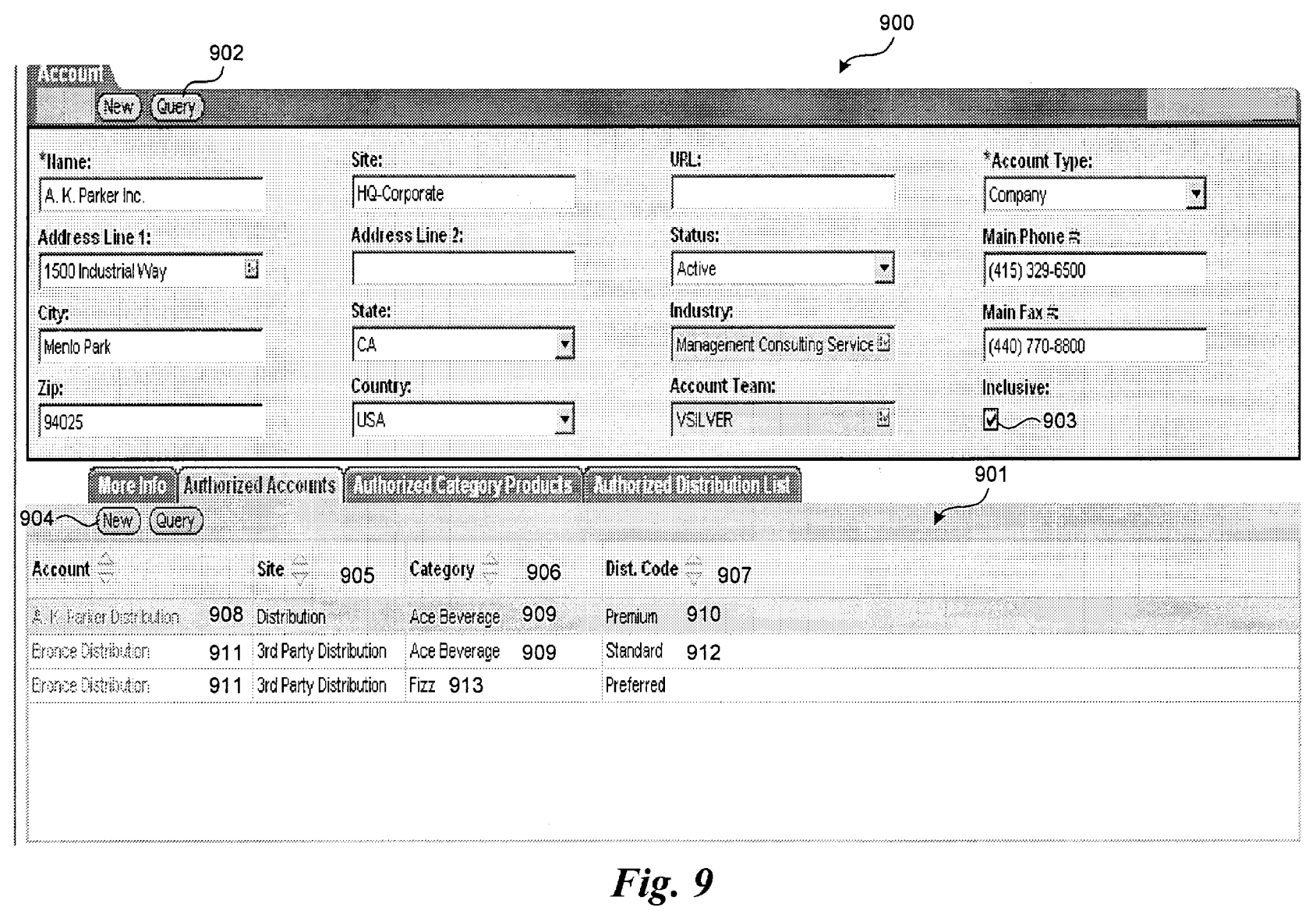

FIG. 9 is a sample user interface showing an account view 900 and an authorized accounts view 901 in one embodiment of the facility. From these views the user can define or redefine subaccount hierarchies. In the account view 900, the user selects an account for which the user intends to define an account distribution hierarchy by performing a query in the list using a QUERY button 902. For direct distribution, the selected account should represent a key distribution point for the customer, such as a distribution warehouse. For indirect distribution, the selected account should be one responsible for indirect distribution (e.g., a third-party distributor). The user has the option of checking an INCLUSIVE checkbox 903 to assign inclusive distribution properties to the account.

In the authorized accounts view 901, the user may cause the facility to display a pick dialog box (not shown) by selecting a NEW button 904. In the pick account dialog box, the user selects an account to add as a subaccount to the key account and fills in the appropriate fields. The fields in the authorized accounts view 901 may include SITE 905, CATEGORY 906 and DISTRIBUTION CODE 907.

Using the CATEGORY 906 and DISTRIBUTION CODE 907 fields, the user specifies categories for an account and distribution codes for each of the specified account categories. For example, because the A.K. Parker Distribution account 908 has been associated with an Ace Beverage category 909 and a premium distribution code 910 for that category, A.K. Parker Distribution will receive all the products of the Ace Beverage category that are marked premium or lower. While Bronce Distribution 911 is also associated with the Ace Beverage category 909, because it has been assigned a standard distribution code 912 it will only receive a subset of the products belonging to the Ace Beverage category, namely only those products that have a distribution code standard or limited. For the products that belong to the Fizz category 913, however, Bronce Distribution 911 will receive all products marked preferred, standard and limited. Managing distribution by category in this way allows brand owners more efficient control of the products a certain distributor or store will receive.

In some embodiments, the user can create multiple records for one subaccount. Each record for the same subaccount may have a different category and each category may have a different distribution code. The hierarchy shown in the authorized accounts view 901 is independent of the standard account hierarchy that enables customers to reduce the number of levels to reflect the distribution chain (e.g., brand-owner, distribution centers and retail outlets).

Figure 10:
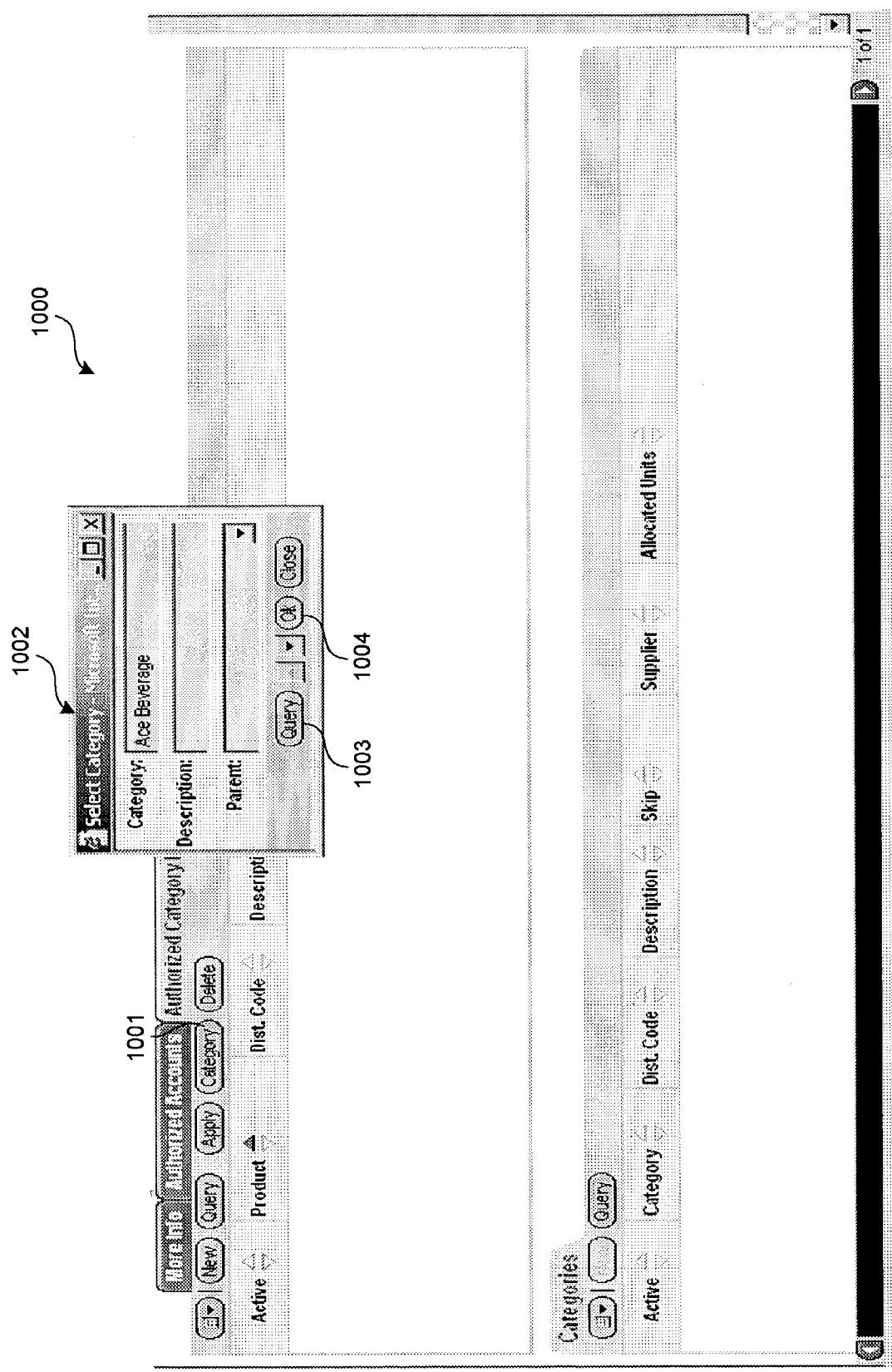
FIG. 10 is a display diagram showing a sample user interface displaying an authorized category products view, from which a user can define distribution codes for product category combinations in one embodiment.
Figure 11:
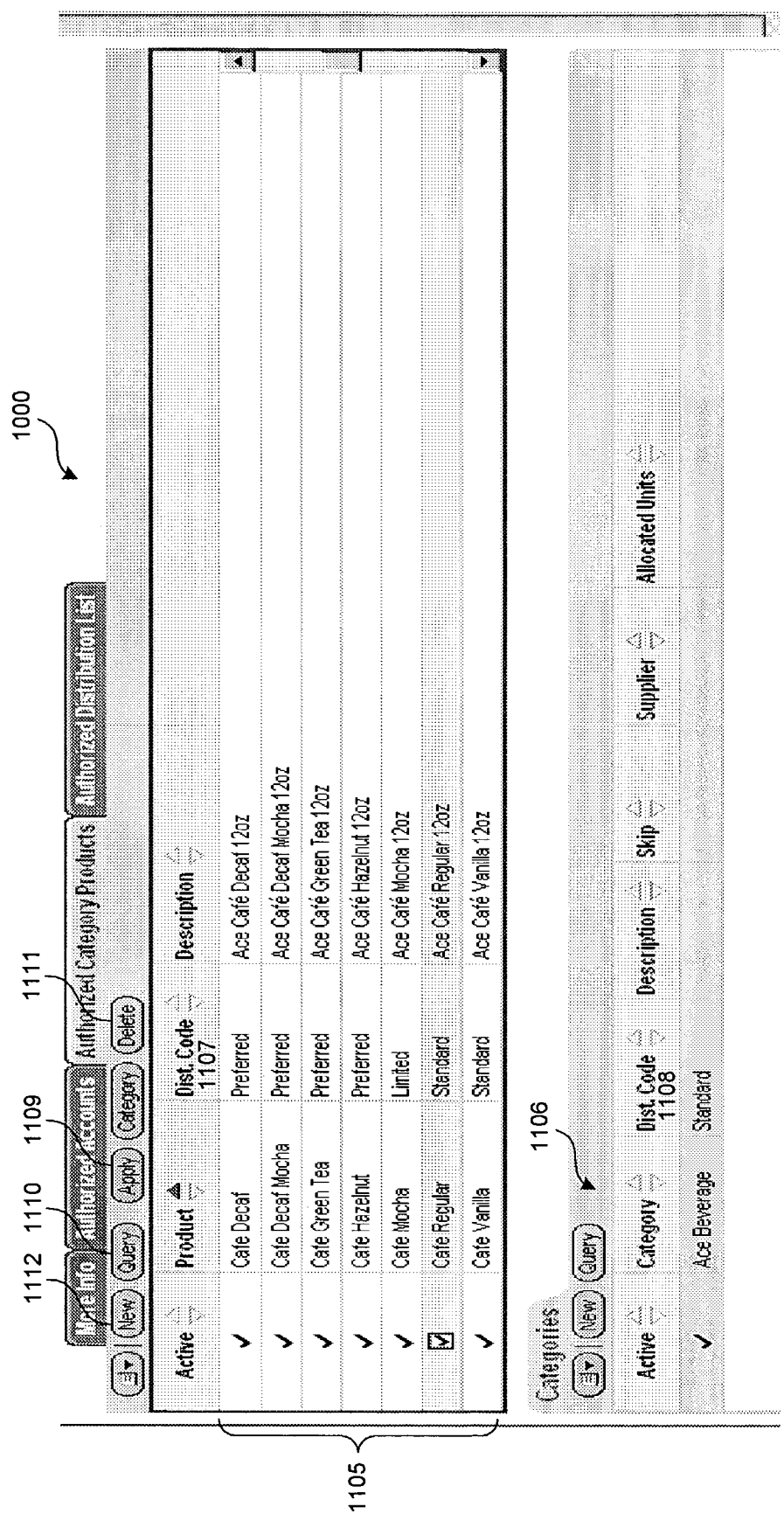
FIG. 11 is a display diagram showing a second sample user interface displaying an authorized category products view, from which a user can define distribution codes for product category combinations in one embodiment.

FIGS. 10 and 11 are sample user interfaces showing an authorized category products view 1000, from which a user can define distribution codes for product category combinations. In the illustrated embodiment, these definitions apply only to a selected key account. In other embodiments, however, product distribution code definitions can be created independently of a specific account, and thus applied to multiple accounts handled by the facility.

To define distribution codes, the user first selects the CATEGORY button 1001. Selection of the CATEGORY button 1001 causes the facility to display a select category dialog box 1002. From the select category dialog box 1002, the user queries for a desired product category using a QUERY button 1003 and then clicks OK 1004. As a result, all products in the selected category appear in an authorized category products list 1105 and the selected category appears in a categories list 1106, as shown in FIG. 11. From the authorized category products list 1105, the user assigns the appropriate product distribution code 1107 to each product if necessary. However, default distribution codes may be initially provided in some embodiments.

In some embodiments, products may be associated with multiple categories. As a result, a single product can have a first distribution code in the context of one category and a second distribution code in the context of a different category. For example, product X may be premium for category A and limited for category B.

By default, in the illustrated embodiment, a DISTRIBUTION CODE field 1108 in the categories list 1106 displays the distribution code of an associated record defined using the authorized accounts view 901 of FIG. 9. The user, however, may change it to a different code if desired. In addition, users may designate accounts as suppliers and allocate units using appropriate fields in the categories list 1106.

From the authorized category products view, the user may also add unauthorized products or delete a product from a product category. To delete a product, the user queries for the product that she wants to delete using a QUERY button 1110. Once the product is selected, the facility will delete the product from the key account's distribution list after the user selects a DELETE button 1111. The product may also be deleted from the subaccount's distribution list if the key account is the sole supplier of the deleted product. To add an unauthorized product (i.e., a product from outside a category) the user selects NEW 1112 in the authorized category products view 1000.

If the user selects APPLY 1109 from the authorized category products view 1000, the facility compares the account-category distribution codes as defined in the DISTRIBUTION CODE field 1108 with the product distribution codes as defined in this authorized category products view 1000. This comparison enables the facility to create a product distribution list for the selected account.

Figure 12:
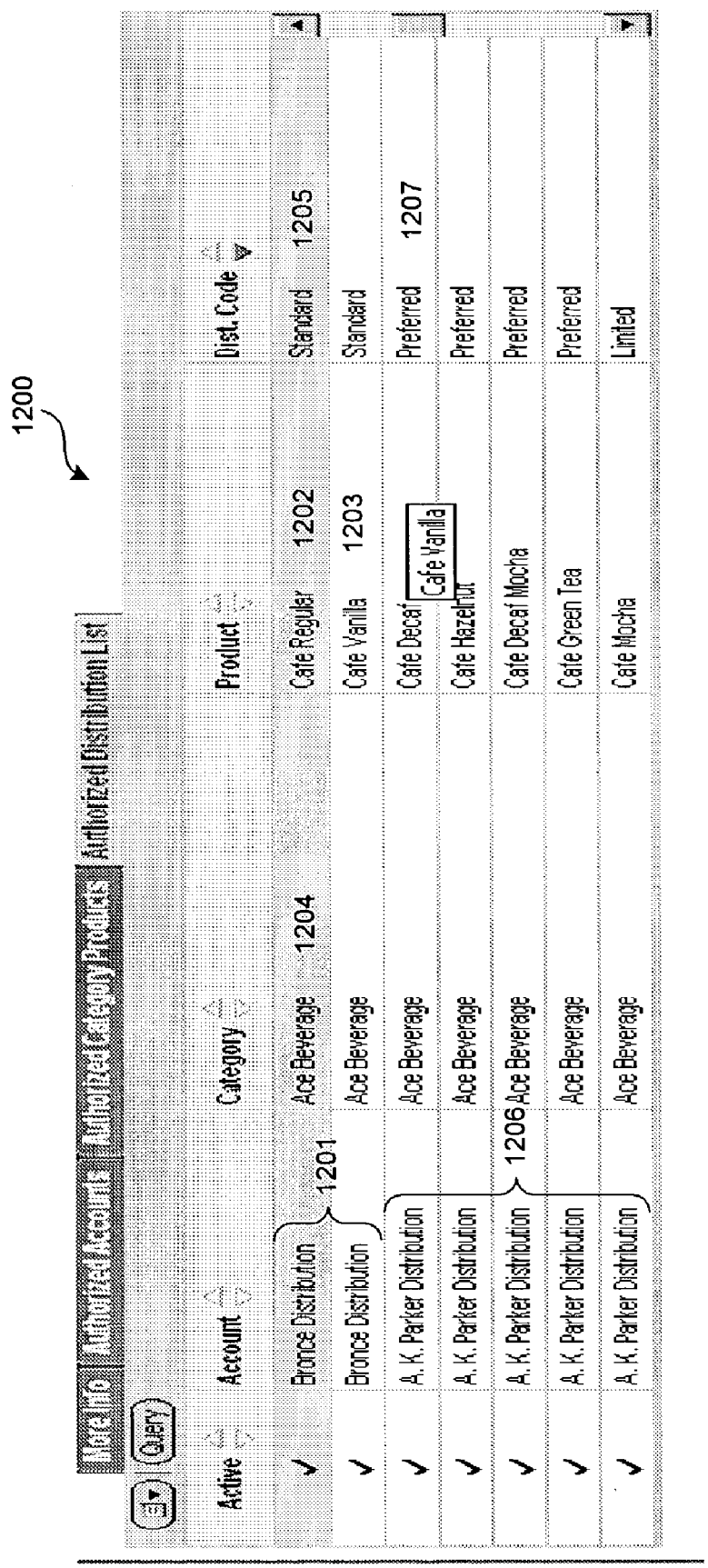
FIG. 12 is a display diagram showing a sample user interface displaying an authorized distribution list view from which a user views a list of all the subaccounts for an account in one embodiment.

FIG. 12 is a sample user interface showing an authorized distribution list view 1200 from which a user may view a list of all the subaccounts for an account. In the example illustrated in FIG. 12, the facility displays all the categories and products that have been assigned to one level of the account hierarchy for the A.K. Parker account. For example, Bronce distribution 1201 will receive Café Regular 1202 and Café Vanilla 1203 because Bronce distribution receives all Ace Beverage category 1204 products that have a distribution code standard 1205 or lower, as do the Café Regular 1202 and Café Vanilla 1203 products. Likewise, A.K. Parker Distribution 1206 receives all the products marked preferred 1207 or lower.

Figure 13:
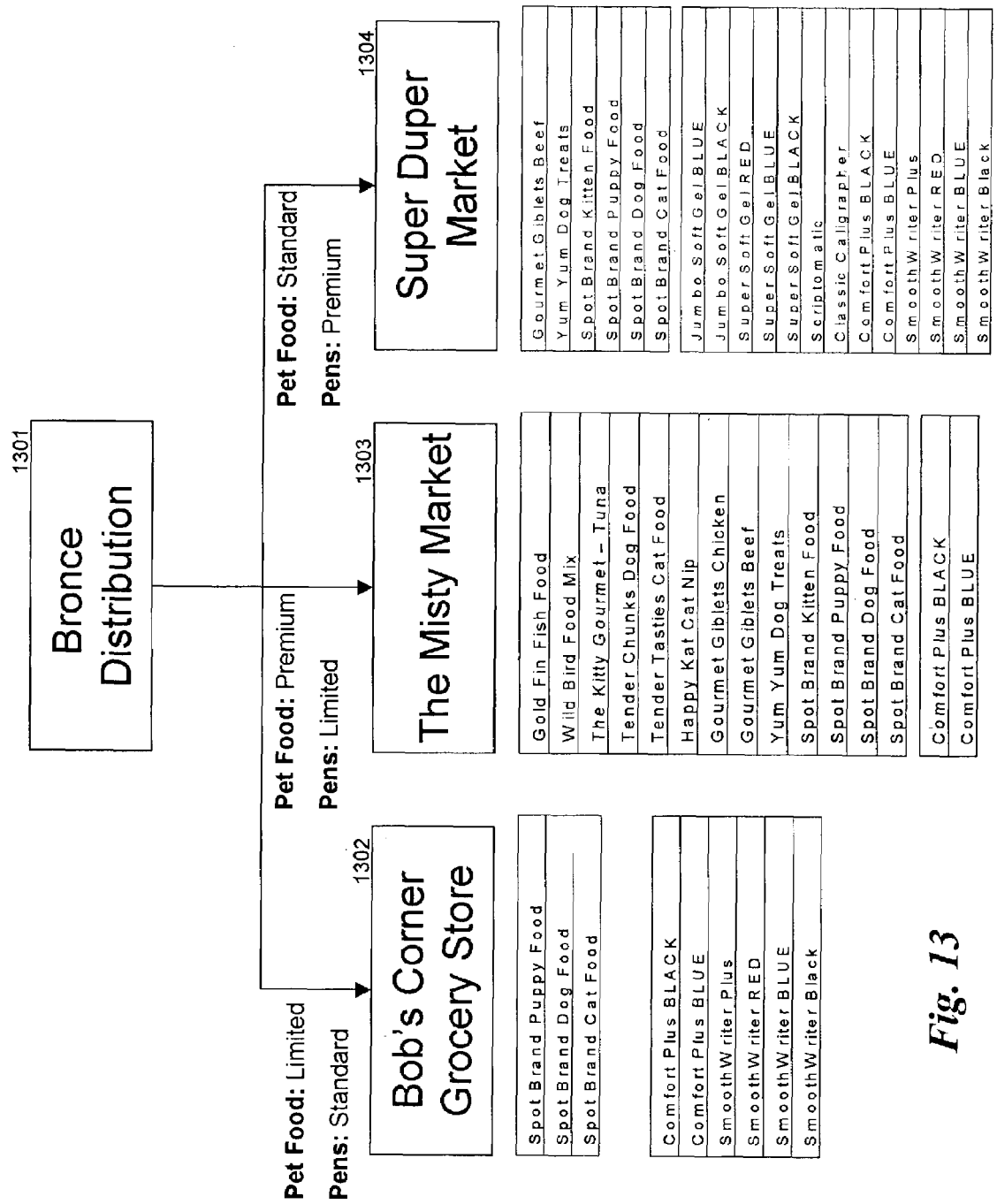
FIG. 13 is a data diagram showing an example of a product distribution hierarchy in one embodiment.

FIG. 13 is a data diagram showing an example of a product distribution hierarchy in one embodiment of the invention. Bronce distribution 1301 receives a premium distribution in both the Pet food and Pens categories so that it can adequately supply its retailers including Bob's Corner Grocery Store 1302, The Misty Market 1303 and Super Duper Market 1304.

Bob's Corner Grocery Store 1302 receives in the Pet Food category only those products with a limited distribution code. For example, Bob's receives Spot Brand Puppy Food, Spot Brand Dog Food and Spot Brand Cat Food. In the Pens category, Bob's receives the products with a standard distribution code including Comfort Plus Pens in both black and blue, Smooth Writer Plus Pens and Smooth Writer Pens in red, blue and black. Unique distributions in both the Pet Food and Pens categories are also shown for The Misty Market 1303 and the Super Duper Market 1304. The products received in the distribution scheme illustrated in FIG. 13 correspond to the sample product/category distribution designation of FIG. 8.

Figure 14:
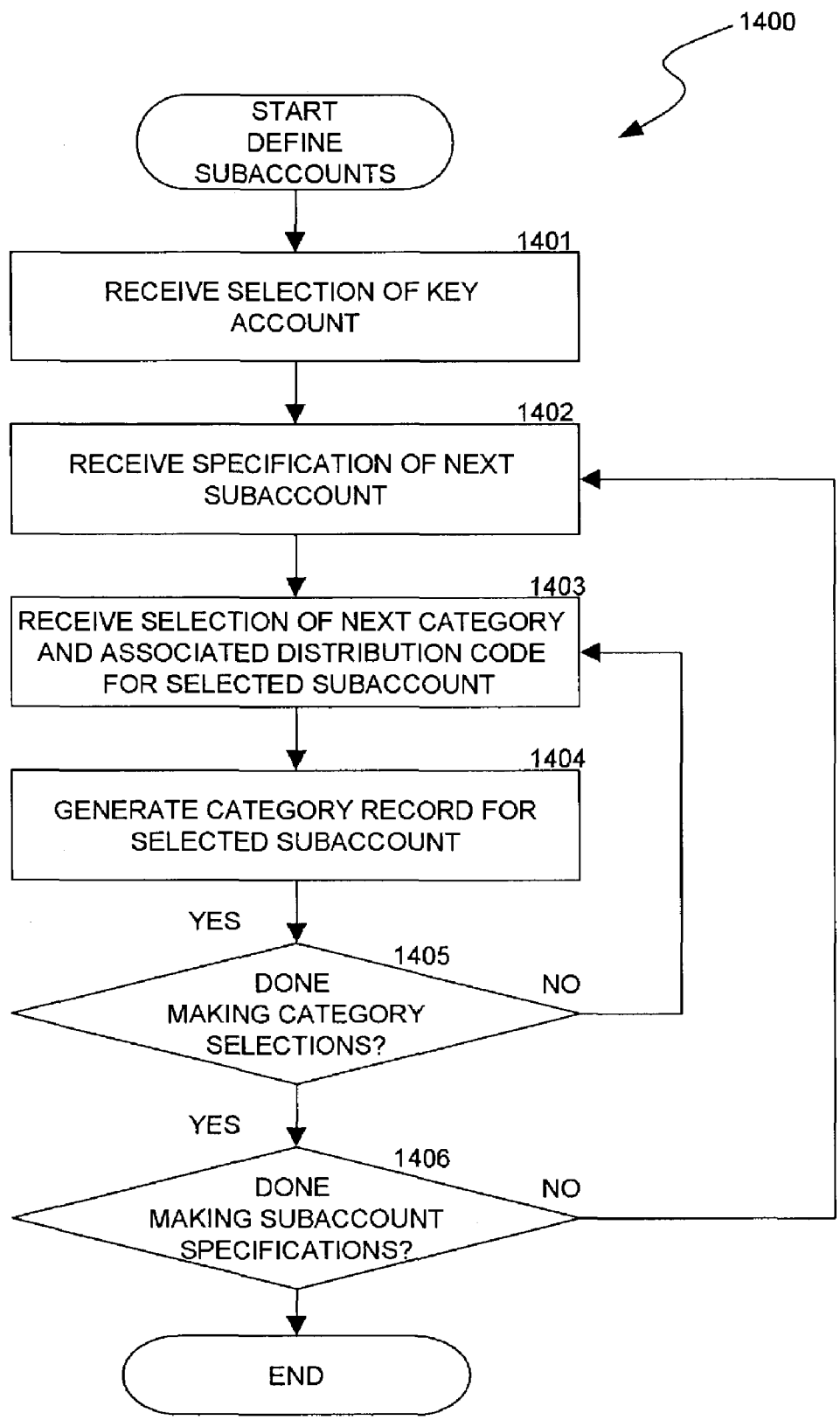
FIG. 14 is a flow diagram showing an example of a routine performed by the facility to define subaccounts related to a key account in one embodiment.

FIG. 14 is a flow diagram showing an example of a routine 1400 performed by the facility to define subaccounts related to a key account. A key account represents a key distribution point for the customer, such as a distribution warehouse. For indirect distribution, it may be the key account responsible for indirect distribution, such as a third-party distributor.

In block 1401 the facility receives, from a user, a selection of a key account. The user may be an administrative user, such as an account manager. The selection may be implemented through a query, or other selection technique. In some embodiments, the selection of the key account may also optionally involve specification of a distribution scheme (e.g., inclusive vs. exclusive) for the key account.

In block 1402 the facility receives, from the user, a specification of a subaccount, such as a retail establishment. At this time, the user may also specify general information related to the subaccount, such as subaccount name, address, etc. In block 1403 the facility receives, from the user, an indication of a category for the subaccount and a distribution code (e.g., premium, preferred, standard, limited) for the category. The facility uses the category/distribution code selection to determine, in part, the products from the selected category that the subaccount will receive. User input for the define subaccount routine 1400 may be implemented via an authorized accounts view, such as the authorized accounts view 901 of FIG. 9.

Once the facility receives the subaccount information described above, in block 1404 the facility generates a record for the subaccount/category relationship. This record may then be used to generate a product distribution list. In decision block 1405 if the user has not completed making product category selections, the routine loops back to block 1403 where the facility receives the next category, distribution code selection. If, however, in decision block 1405 the user has completed making product category selections, the routine continues at decision block 1406. In decision block 1406 if the user has not completed specifying subaccounts for the key account, the routine loops back to block 1402 where the facility receives the next subaccount specification. If, however, in decision block 1406 the user has completed specifying subaccounts for the key account, the routine ends.

Figure 15:
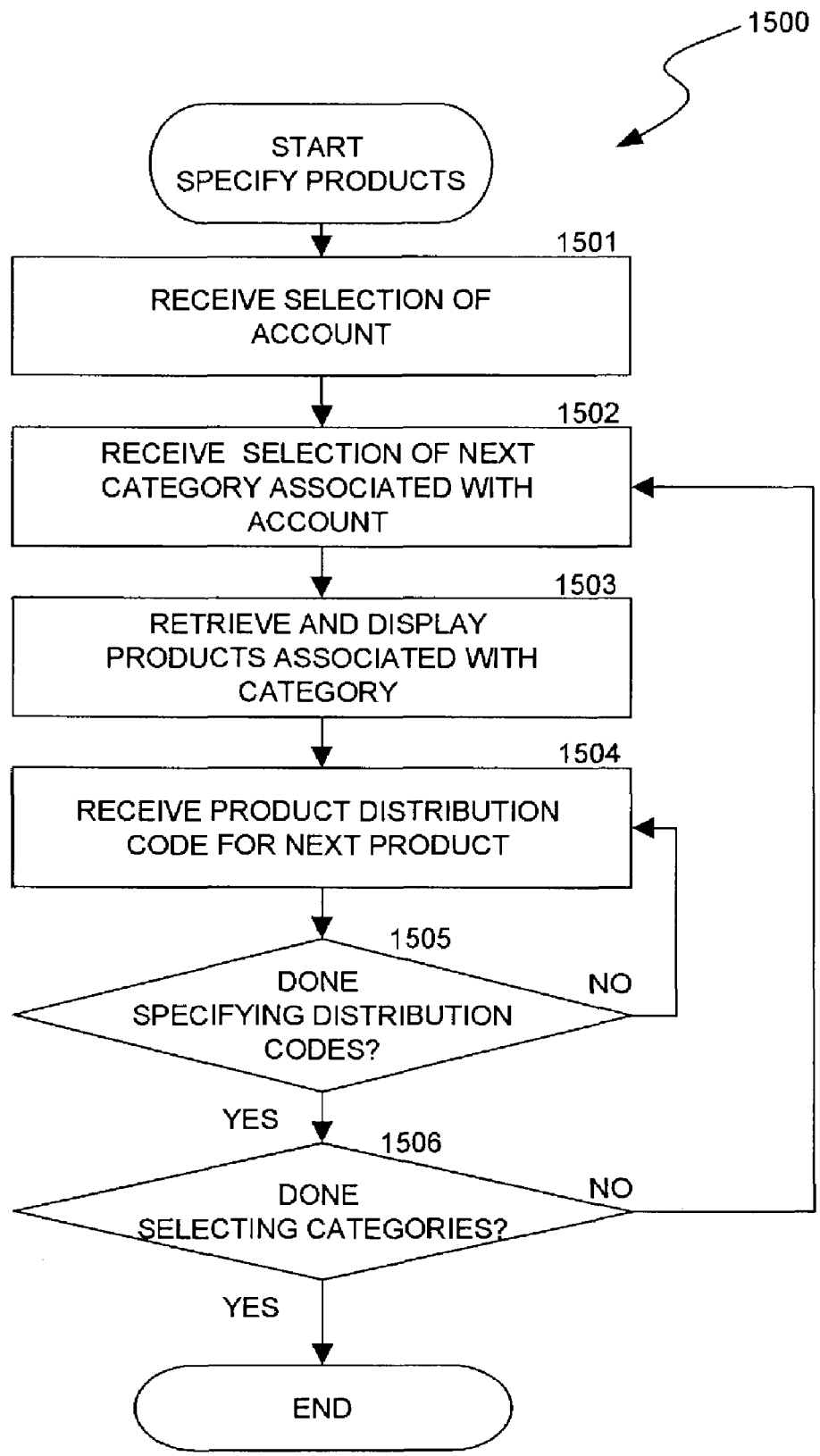
FIG. 15 is a flow diagram showing an example of a routine performed by the facility to define product distribution code relations for a category of products in one embodiment.

FIG. 15 is a flow diagram showing an example of a routine 1500 performed by the facility to define product distribution code relations for a category of products.

In block 1501 the facility receives, from a user, a selection of an account. As in the define subaccount routine 1400 described above, the user may be an administrative user, such as an account manager. The selection may be implemented through a query, or other selection technique.

In block 1502 the facility receives, from the user, a selection of a category identified with the account. The selection of the category may be implemented using a query function, and selected from a general catalog of categories or, alternatively, from a list of categories already associated with the account via a subaccount. Once the facility receives the category selection of block 1502, in block 1503 the facility retrieves and displays all products associated with the selected category.

In block 1504, the facility receives a product distribution code (e.g., premium, preferred, limited, etc.) for the next product listed for the product category. In some embodiments, each product may be associated with a default product distribution code, which the user may alter. During distribution list generation (see block 1605 of FIG. 16), this distribution code can then be compared with subaccount category distribution codes to determine whether the product will be included in a distribution list for the account.

In decision block 1505 if the user has not completed specifying product distribution codes for each product in the category, the routine loops back to block 1504 where the facility receives the next category, distribution code selection. If, however, in decision block 1505 the user has completed specifying product distribution codes for each product in the category, the routine continues at decision block 1506. In decision block 1506 if the user has not completed selecting categories for the account, the routine loops back to block 1502 where the facility receives the next category selection for the account. If, however, in decision block 1506 the user has completed selecting categories for the account, the routine ends.

Figure 16:
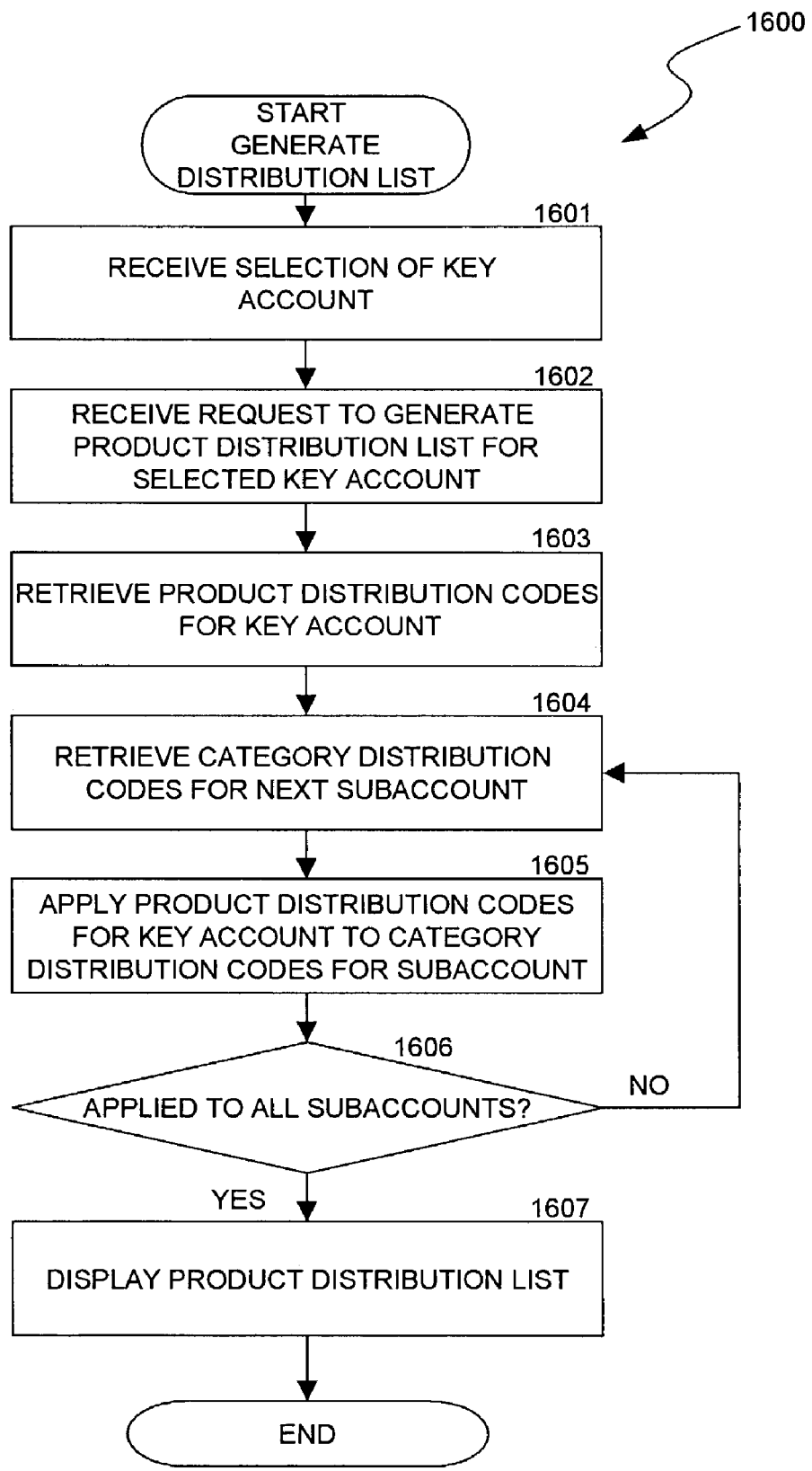
FIG. 16 is a flow diagram showing an example of a routine performed by the facility to generate a product distribution list for a hierarchy of accounts in one embodiment.

FIG. 16 is a flow diagram showing an example of a routine 1600 performed by the facility to generate a product distribution list for a key account.

In block 1601 the facility receives, from a user, a selection of a key account. As in routine 1400 and routine 1500 described above, the user may be an administrative user, such as an account manager. The selection may be implemented through a query, or other selection technique.

In block 1602 the facility receives, from the user, a request to generate a product distribution list for the key account. For example, the user may select the APPLY button 1109 shown in FIG. 11. Once the facility receives the request, the facility in block 1603 retrieves the product distribution code records for each key account. In block 1604, the facility retrieves the category selections and category distribution code associations for the next subaccount. Then, in block 1605, the facility applies the product distribution code records of block 1603 to the distribution code associations of block 1605. In this way, the facility can generate information for a distribution list.

In decision block 1606 if the facility has not performed the steps of blocks 1604 and 1605 for all subaccounts under the key account, the routine loops back to block 1604 where the facility retrieves the category selections and category distribution code associations for the next subaccount. If, however, in decision block 1606 the facility has performed the steps of blocks 1604 and 1605 for all subaccounts under the key account, the routine continues at block 1607, where the facility displays a product distribution list for the key account. After block 1607 the routine ends.

Once administrative users define account hierarchies and product category definitions, end users can view the products on an account's distribution list, add products outside the distribution hierarchy (i.e., unauthorized products) to a subaccount's distribution list, and modify an account's distribution list by navigating to the accounts view screen, selecting the account by performing a query in the list and selecting a distribution list view tab (not shown).

In some embodiments, an end user may be permitted to view competitor products (not shown) from the Authorized Distribution list view. End users responsible for account audits can then associate competitor products with the account they plan to audit. To view competitor products, for example in conducting retail audits, the competitor products must be present in the distribution list of the account. Adding competitor products to an end user's products list may be designated an administrator-only process. In some embodiments, the user may also be able to add unauthorized products to an account's distribution list (not shown).

From the foregoing, it will be appreciated that specific embodiments of the invention have been described herein for purposes of illustration, but that various modifications may be made without deviating from the spirit and scope of the invention. For example, in some embodiments, additional functionality may be implemented along with the basic functionality described above, such as providing a functionality for associating an account's authorized product with merchandising locations so that the user can assign a specific physical location for that product, such as one or more display locations within a retail outlet or within a bin in a warehouse. In another example, the facility may allow users to associate products with account merchandising locations. In some embodiments users can indicate the sizes and size scales of manufactured products such as apparel and footwear. In some embodiments, the user can also establish a distribution of sizes, or a quantity multiplier for each size, usually based on marketing trends. Establishing sizes and size distributions automates much of the process of designating sizes and quantities when sales representatives are assembling customer quotes or assortment plans. Other features of the facility may include allowing users to assign multiple merchandising locations to an account. Moreover, other details, such as the ordering or naming of distribution codes, user interface, data fields, etc., may be modified without departing from the scope of the invention. Accordingly, the invention is not limited except as by the appended claims.

We claim:

1. In a computer system, a method for specifying the distribution of items, the method comprising:
   associating one or more item categories with a selected account, wherein
      each item category is associated with a set of items;
   associating a distribution code with each of the one or more item categories, wherein
      the distribution code is further associated with a subset of the set of items associated with the item category; and
   based on the distribution code for each item category, identifying items from the one or more item categories for an item distribution list for the selected account.

2. The method of claim 1 further comprising:
   generating and displaying the item distribution list.

3. The method of claim 1 wherein the identified distribution code corresponds to a distribution level option defined by a user.

4. The method of claim 1 wherein each item of the set of items is associated with an item distribution code.

5. The method of claim 1 wherein the item distribution list supports an exclusive distribution scheme.

6. The method of claim 1 wherein the item distribution list supports an inclusive distribution scheme.

7. In a computer system, a method for specifying the distribution of products, the method comprising:
   defining a plurality of product categories, wherein each product category comprises a set of products;

defining a plurality of distribution codes, wherein the distribution codes are hierarchically organized;
associating a selected account with one or more product categories of the plurality of product categories; and
associating each selected product category with a selected distribution code.

8. The method of claim 7 further comprising:
creating a record for each selected product category using the selected distribution code.

9. The method of claim 7 wherein the selected account is a subaccount in an account hierarchy.

10. The method of claim 7 wherein the selected account is a supplier account.

11. The method of claim 7 wherein the selected account is a retailer account.

12. A method comprising:
generating a product distribution list (PDL) for a selected account, wherein
the PDL comprises an identification of products for distribution to the selected account, and
said generating comprises
associating one or more accounts to one or more categories, wherein
the one or more accounts comprise the selected account and each category has an associated distribution level
associating the one or more categories to one or more products,
specifying an instance of an association of the one or more products each to one or more distribution codes, and
determining the identification of products by comparing the distribution level associated with a category of the one or more categories associated with the selected account to the specified instance of the association of products to distribution codes.

13. The method of claim 12 wherein an association of accounts to categories is initialized upon receiving a selection to assign a category to an account.

14. The method of claim 12 further comprising:
initializing the specified instance of the association of products to distribution codes using default values.

15. The method of claim 12 further comprising:
initializing the specified instance of the association of products to distribution codes upon receiving a selection to assign a distribution code to a product.

16. The method of claim 12 wherein a product can be associated with more than one category.

17. The method of claim 12 wherein a product can be associated with more than one distribution code.

18. The method of claim 12 further comprising:
initializing the association of products to distribution codes for each instance of an account.

* * * * *